United States Patent
Müller

(10) Patent No.: US 6,952,159 B1
(45) Date of Patent: Oct. 4, 2005

(54) COUPLING DEVICE

(75) Inventor: Kurt Müller, Uster (CH)

(73) Assignee: Ascom Powerline Communications AG, Bern (CH)

( * ) Notice: Subject to any disclaimer, the term of this patent is extended or adjusted under 35 U.S.C. 154(b) by 33 days.

(21) Appl. No.: 10/296,905

(22) PCT Filed: May 30, 2000

(86) PCT No.: PCT/CH00/00304

§ 371 (c)(1),
(2), (4) Date: Nov. 27, 2002

(87) PCT Pub. No.: WO01/93451

PCT Pub. Date: Dec. 6, 2001

(51) Int. Cl.[7] ............................................ H04M 11/04
(52) U.S. Cl. ........................ 340/310.08; 340/310.01; 340/310.03; 340/310.04; 375/222; 375/223; 375/237; 330/100; 330/131; 330/24 R; 330/167; 330/175; 330/177
(58) Field of Search ...................... 340/310.08, 310.01, 340/310.03, 310.04; 375/222, 223, 237; 330/100, 330/131, 24 R, 167, 175, 177

(56) References Cited

U.S. PATENT DOCUMENTS

| | | | |
|---|---|---|---|
| 5,115,368 A | | 5/1992 | Smith ........................... 361/56 |
| 5,664,002 A | * | 9/1997 | Skinner, Sr. ................ 379/56.2 |
| 5,777,769 A | * | 7/1998 | Coutinho ..................... 398/171 |
| 6,243,413 B1 | * | 6/2001 | Beukema ..................... 375/222 |

FOREIGN PATENT DOCUMENTS

| | | |
|---|---|---|
| EP | 0 477 660 A2 | 4/1992 |
| EP | 0 981 188 A1 | 2/2000 |
| JP | 007264107 * | 10/1995 ............ H04B 3/54 |

* cited by examiner

Primary Examiner—Tai T. Nguyen
(74) Attorney, Agent, or Firm—Birch, Stewart, Kolasch & Birch, LLP

(57) ABSTRACT

A coupling apparatus (1) having a mains connection (2) for connection to a low-voltage mains power supply system, and having an appliance connection (3) for connection of any appliance for transmitting and/or receiving an RF signal has a voltage converter (5) and a high-pass filter (6.1, 6.2). The voltage converter converts the mains voltage which is present at the mains connection to a very-low voltage, which is suitable for supplying the appliance connected to the appliance connection. Inductances (4.3 to 4.6) of suitable size are interposed in the appropriate connecting lines as low-pass filters for decoupling the RF signal path from the supply signal path, and for suppressing undesirable, radio-frequency signal components in the supply voltages. RF signals which are transmitted or are to be transmitted via the low-voltage mains power supply system are coupled from the mains connection via the high-pass filter to the appliance connection, and from the appliance connection to the mains connection. In order to supply further appliances with mains voltage, the coupling apparatus has an additional appliance connection (7), which is likewise low-pass-filtered by means of inductances (4.3, 4.4).

15 Claims, 2 Drawing Sheets

COUPLING DEVICE

This application is the national phase under 35 U.S.C. § 371 of PCT International Application No. PCT/CH00/00304 which has an International filing date of May 30, 2000, which designated the United States of America.

TECHNICAL FIELD

The invention relates to a coupling apparatus having a mains connection for connection to a low-voltage mains power supply system and having an appliance connection for connection of an appliance for transmitting and/or receiving an RF signal.

Prior Art

Electronic communication, that is to, say the transmission of data in electronic form, is becoming increasingly important. This is just as true when supplying a banking specialist with the latest stock market data directly to his desk, or for switching on the heating at home by remote control when returning from a winter holiday. The appropriate data are normally generated and processed in data terminals such as computers, which are connected to the mains power supply system in order to supply them with power.

One possible transport path for such data is the mains power supply system itself. For this purpose, the messages are coded and are modulated in a known manner, for example by frequency modulation, onto a radio-frequency carrier signal. The modulated carrier signal is input from the respective transmitter into the low-voltage mains power supply system, and is output, demodulated and decoded once again in the same manner by the respective receiver.

Special modems, which are connected between the appropriate data terminal and the mains power supply system, are used for modulation and demodulation of the signals. Such a modem requires two connections to the mains power supply system, one connection for supplying the modem with electrical power and a second connection for inputting and outputting the modulated radio-frequency signal (RF signal).

Various ways are known to allow such a modem to be connected to a low-voltage mains power supply system. One option is to provide the mains system supply and the RF signal separately, that is to say on two different cables into the modem, with a coupler being required for inputting and outputting the RF signal and being connected firstly to the low-voltage mains power supply system and secondly via a signal cable to the modem. The modem is supplied using a commercially available mains cable or a connector power supply unit. For this variant, however, two cables and an additional coupler are required, which results in a large cost increase and more space being required.

A further option for connection of the modem is to route the mains supply and the RF signal simultaneously via a commercially available mains cable into the modem. In this variant, the coupler for inputting and outputting the RF signal is integrated directly in the modem.

However, this variant has the disadvantage that the low voltage is carried directly into the modem, which means not only a larger appliance but also increased complexity with regard to insulation and safety tests, and thus increased costs. Country-specific adaptations are frequently required for appliances of this type, likewise leading to increased production and logistic costs.

DESCRIPTION OF THE INVENTION

The object of the invention is to specify an apparatus of the type mentioned above, which can be produced cost-effectively and in a compact form.

The object is achieved as defined by the features of claim 1. According to the invention, a corresponding coupling apparatus has a mains connection for connection to a low-voltage mains power supply system, and an appliance connection for connection of a modem, that is to say of an appliance for transmitting and/or receiving an RF signal. In order to supply a modem connected to the appliance connection, the coupling apparatus also has a voltage converter, which is used to convert a low voltage which is present at the mains connection to a very-low voltage which can be emitted at the appliance connection. In order to input and output an RF signal which is respectively to be transmitted or received, the coupling apparatus, finally, has a coupler, which provides radio-frequency coupling between the mains connection and the appliance connection.

A coupling apparatus according to the invention has a wide range of advantages. It allows those circuit parts which are subject to particular requirements with regard to dielectric strength (personnel protection and equipment protection) to be provided separately from the modem. It can be produced in large quantities at extremely low cost. Country-specific adaptations, for example relating to dielectric strength, the mains voltage or the mains plug, can be incorporated without any problems in the coupling apparatus, so that the same modem can be used, unchanged, universally. The increased quantities and the change in the position of the coupler and of the power supply unit on the one hand, as well as the avoidance of the insulation gaps, which take up a large amount of space, on the other hand (for example the insulation gap between the primary part of the power supply and the EMC screening of the modem) can also be provided in a compact manner and cost-effectively by means of the modem. Furthermore, the change in the position of the power supply unit means that some of the heat losses occur externally, which allows further compression of the modem. The reduced amount of space required and the lower voltage level mean that the invention allows a corresponding modem to be in the form of a PC push-in card, which is virtually impossible with known solutions.

Low-voltage alternating current is normally used for transmitting electrical power from the mains power supply system to the end user. The voltage converter is therefore preferably designed in such a manner that it can convert a low AC voltage, which is present at the mains connection, to a very-low DC voltage which can be emitted at the appliance connection (AC/DC converter), although other voltage converters (AC/AC, DC/DC or else DC/AC converters) which convert the supplied mains voltage to a very-low voltage which can be used to supply the modem can, of course, also be used.

In one preferred embodiment of the invention, a low-pass filter is provided upstream and/or downstream of the voltage converter, that is to say between the mains connection and the voltage converter, and/or between the voltage converter and the appliance connection. These low-pass filters prevent the propagation of undesirable radio-frequency interference which are produced, for example, by line terminations that are not clean or by switching processes, and which can severely influence the desired transmission of an RF signal injected into the mains power supply system.

In the context of the invention, the term low-pass filters means low-pass filters which have a high impedance for the RF signal on the input side. They should thus have inductances in the series direction, but no capacitances in the parallel direction.

The RF coupling between the mains connection and the appliance connection is preferably achieved by means of a high-pass filter which effectively bypasses the voltage converter. The high-pass filter prevents low-frequency signals such as the supply signal being passed directly from the mains connection to the appliance connection. The high-pass filter is designed such that it couples only the RF signals which are to be transmitted from the mains connection to the appliance connection, and from the appliance connection to the mains connection.

Suppression of radio-frequency interference signals is only one object of the low-pass filters. They are primarily used for decoupling the voltage converter from the signal transmission path that passes via the high-pass filters. The voltage converter should absorb as little signal power as possible both on the input side and on the output side. That is to say, the low-pass filters reduce the influence of the voltage converter on the signal path.

This simple but efficient design of the coupling apparatus allows compact and advantageous implementation, in which case, for example, suitably designed bandpass filters can also be used instead of high-pass and low-pass filters.

The coupling apparatus is connected by its mains connection to, for example, a low-voltage mains power supply system. For this purpose, the coupling apparatus has, for example, a mains plug which can be inserted directly into a mains plug socket. The mains connection could also be in the form of a mains cable with a mains plug formed at the mains system end and having pins, with the mains cable either being inserted directly into the coupling apparatus or being connected via a plug to a corresponding socket on the coupling apparatus. Such mains cables are often used for connecting appliances to mains supply systems. A modem, for example, can be connected to the appliance connection.

The voltage converter converts the low voltage which is present at the mains connection, for example an AC voltage at a frequency in the order of magnitude of 50 Hz, and with an amplitude in the order of magnitude of 230 V or 400 V, to a very-low voltage, for example a DC voltage in the order of magnitude of approximately 12 V.

The appliance connection of the coupling apparatus is advantageously designed in such a manner that an appliance which can be operated with electrical power can be connected to it and it can be supplied with the very-low voltage produced by the voltage converter while, at the same time, an RF signal which is received at the mains connection and is coupled to the appliance connection via the coupler can be transmitted via the appliance connection to the appliance connected to it. This system also operates in the other direction, of course, that is to say an RF signal received by an appliance connected to the appliance connection is coupled from the coupler to the mains output and to the low-voltage mains power supply system, with the appliance at the same time being supplied via the appliance connection with the very-low voltage produced by the voltage converter.

In a further preferred embodiment of the coupling apparatus, this coupling apparatus has at least one additional appliance connection, to which an appliance which can be operated with electrical power can be connected, in order to supply it with power.

The configuration of this additional appliance connection generally depends on the voltage signal to be supplied. If the appliance connected to it is intended to be supplied with the low mains voltage, the connection is, for example, in the form of an appliance plug socket, which is compatible with conventional mains plug sockets and into which the mains cable of the appliance to be connected can be inserted. If, on the other hand, the appliance is intended to be supplied with a very-low voltage such as that supplied by the voltage converter, the appliance connection is matched to the appropriate requirements and regulations.

In order to allow as many appliances as possible, for example a computer for processing the messages received via the coupling apparatus and modem, to be connected to a coupling apparatus according to the invention, the additional appliance connection is preferably designed for supplying mains voltage. The additional appliance connection is to this end connected via a mains link to the mains connection of the coupling apparatus, with the mains link passing via a low-pass filter located between the voltage converter and the mains connection, provided such a low-pass filter is present. This means that, seen from the mains connection, the mains voltage is tapped off and passed to the additional appliance connection only downstream of the low-pass filter, which means, firstly, that the connected appliance is decoupled from the signal transmission path and, secondly, that undesirable radio-frequency interference signals cannot pass either from the mains system into the connected appliance, or from the appliance into the mains system.

One specific, preferred embodiment of the coupling apparatus is used for connecting a modem, which is supplied with a DC voltage, to a low-voltage mains power supply system having at least two electrical conductors, that is to say a neutral conductor and at least one phase conductor. In consequence, the voltage converter has two input contacts and two output contacts. The appliance connection comprises a positive and a negative electrode, which are each connected via a connecting line to the two output contacts of the voltage converter. The mains connection and any additional appliance connection which may also be present comprise a neutral conductor and at least one phase conductor, with two of these electrical conductors each being connected via one connecting line to one input contact of the voltage converter.

In principle, it is also possible for the voltage converter to have more than two input and output contacts, and for each electrical conductor to be connected to corresponding input contacts of the voltage converter. In this case, the voltage converter either supplies a number of output voltages or can be controlled in such a manner that it in each case converts the voltage between two of the connected electrical conductors, producing this at the output.

Two of the electrical conductors of the mains connection are connected via radio-frequency lines to a respective electrode of the appliance connection, typically with those two electrical conductors being selected via which the RF signal is transmitted, or is intended to be transmitted. As a rule, these are the neutral conductor and the phase conductor, although the RF signal can also be transmitted via two phase conductors.

The radio-frequency lines could, of course, also be passed via a type of phase selector which, with the capability for manual or automatic control, in each case connects two of the electrical conductors from the mains connection to the two electrodes at the appliance connection.

One preferred embodiment of the high-pass filter comprises just one capacitance per connecting line between the mains connection and the appliance connection, with the value of the capacitances being matched to the frequency of the RF signals to be transmitted.

One preferred embodiment of the low-pass filters between the mains connection and the voltage converter or between the voltage converter and the appliance connection comprises just one inductance, for example one induction coil per connecting line. In this case as well, the values of the inductances are matched to the transmission frequencies and/or to the interference signals to be eliminated.

These inductances, in particular those between the mains connection and the voltage converter, eliminate or minimize the influence of any appliance connected to the additional appliance connection on the transmission of the RF signal.

In order to achieve a certain amount of protection for the coupling apparatus itself or for appliances connected to it, the coupling apparatus is advantageously designed for connection to a mains power supply system having a protective conductor, for example an earth conductor. The mains connection for this purpose likewise has a protective conductor, which is passed on to any additional appliance connection which may be present, with a low-pass filter which is present between the mains connection and the voltage converter and via which the electrical conductors are passed between the mains connection and the additional appliance connection, not including the protective conductor. This means that the protective conductor has no inductance.

Although coupling apparatus whose components are integrated in another appliance or are distributed between two or more appliances are undoubtedly also covered by the invention, the coupling apparatus is preferably accommodated in its own dimensionally stable housing. The mains connection of the coupling apparatus is in this case in the form of a mains plug for insertion into a mains plug socket of the corresponding low-voltage mains power supply system. The appliance connection is in the form of a supply/signal cable, which is passed out of the housing and, at the other end, has a connecting apparatus matched to the signal frequency and to the connected appliance. Any additional appliance connection which may be present is in the form of a plug socket, into which, for example, appliance mains plugs can be inserted, which are designed for insertion into a mains plug socket of the corresponding low-voltage mains power supply system.

The form of the housing and the arrangement of the connections are in this case chosen such that the coupling apparatus can be connected by its mains connection to a low-voltage mains power supply system and, at the same time, not only can an appliance which is to be supplied with the very-low voltage be connected to the appliance connection, but an appliance which is to be supplied with the mains voltage can be connected to the additional appliance connection which may be present.

A coupling apparatus of the type just described can, for example, be used in a transmission arrangement having a transmitting/receiving apparatus, with the transmission arrangement being used for inputting and outputting messages into and out of a low-voltage mains power supply system. An RF signal is generated by the transmitting/receiving apparatus, in particular a modem, from the messages to be transmitted, by this modem modulating the messages onto a radio-frequency carrier signal, for example, after suitable preprocessing. The transmitting/receiving apparatus is connected to the appliance connection of the coupling apparatus, via which it passes on the RF signal to this apparatus. The coupling apparatus couples the RF signal from the appliance connection to the mains connection, and thus into the low-voltage mains power supply system. The transmitting/receiving apparatus is also supplied via the appliance connection with electrical power at the mains voltage converted to a very-low voltage by the voltage converter.

The transmission of the messages or of the RF signal also operates, of course, in the opposite direction. The RF signal passes via the mains connection to the coupling apparatus, where it is coupled via the high-pass filter to the appliance connection. The transmitting/receiving apparatus connected to the appliance connection demodulates the RF signal and makes the messages contained in it available for further processing. In this case as well, the mains voltage is converted by the voltage converter to a very-low voltage, and the transmitting/receiving apparatus is supplied with this very-low voltage via the appliance connection.

Further advantageous embodiments and feature combinations of the invention will become evident from the following detailed description and from the totality of the patent claims.

BRIEF DESCRIPTION OF THE DRAWINGS

In the drawings used to explain the exemplary embodiment.

In principle, identical parts are provided with the same reference symbols in the figures.

WAYS TO IMPLEMENT THE INVENTION

Figure 1:
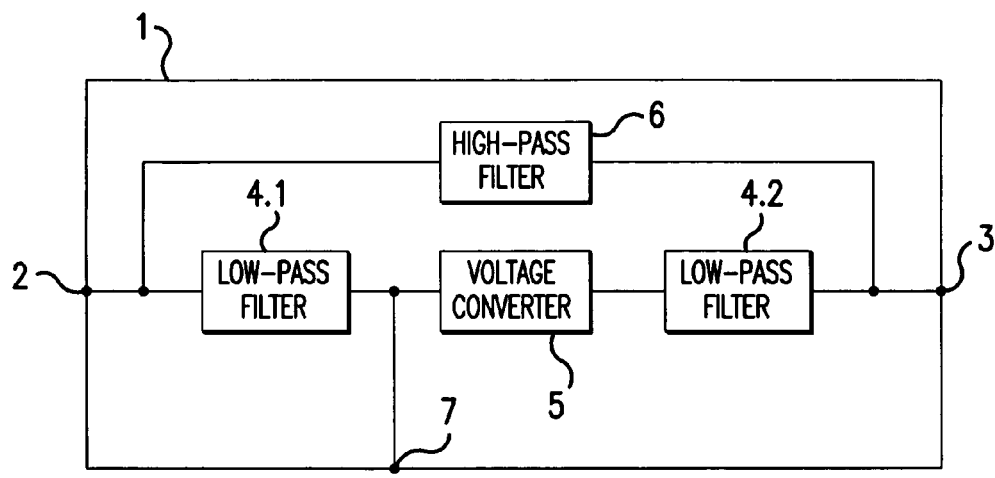
FIG. 1 shows a schematically illustrated coupling apparatus.

FIG. 1 shows, schematically, one example of a coupling apparatus 1 according to the invention. The mains connection 2 is located on one side, and the appliance connection 3 on the other side. The mains connection 2 is connected to the appliance connection 3 via two different paths. The first path passes from the mains connection 2 via a low-pass filter 4.1 to the input of a voltage converter 5, and from its output via a further low-pass filter 4.2 to the appliance connection 3. The second path passes from the mains connection 2 via a high-pass filter 6 directly to the appliance connection 3. Furthermore, this coupling apparatus 1 has an additional appliance connection 7, which is likewise connected to the mains connection 2 via the low-pass filter 4.1. The low-pass-filtered mains voltage which is present at the mains connection 2 is thus tapped off, for the additional appliance connection 7, between the low-pass filter 4.1 and the voltage converter 5.

The mains connection 2 is used for connecting the coupling apparatus 1 to a low-voltage mains power supply system. One example of this is a mains power supply system having a neutral conductor, at least one phase conductor and an earth conductor, with the rated frequency being 50 Hz and the rated voltage being 230 V (phase-neutral conductor) or 400 V (phase—phase). The voltage converter 5 transforms the mains voltage which is present at the mains connection 2 to a very-low voltage, for example a 12 V DC voltage, with which an appliance connected to the appliance connection 3 can be supplied. The low-pass filters 4.1 and 4.2 provide decoupling for the signal transmission path from the voltage converter 5 and from the additional appliance connection 7, respectively. Furthermore, the low-pass filters 4.1 and 4.2 prevent the radio-frequency signal components in the mains signal from passing via the voltage converter 5 to the appliance connection 3 and, respectively, via the voltage converter 5 into the mains power supply system. The deliberate transmission of the radio-frequency message signals takes place via the high-pass filter 6, which couples these signals from the mains connection to the appliance connection, and from the appliance connection to the mains connection.

Figure 2:
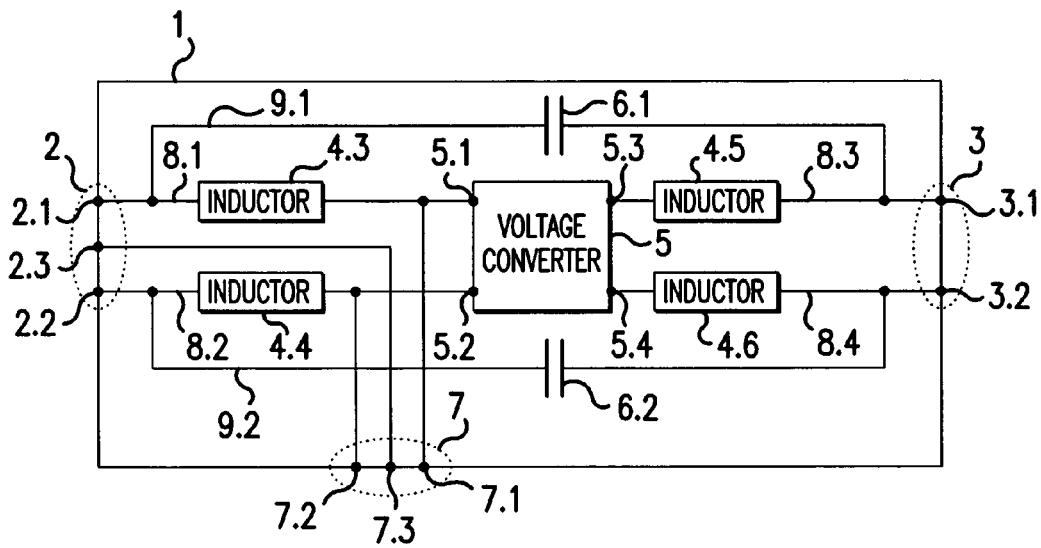
FIG. 2 shows a schematically implemented embodiment of the coupling apparatus.

FIG. 2 shows, schematically, an exemplary embodiment of the coupling apparatus 1 shown in FIG. 1. The mains connection 2 comprises one phase conductor 2.1, one neutral conductor 2.2 and an earth conductor 2.3. The appliance connection 3 comprises a positive and a negative electrode 3.1 and 3.2, respectively. The voltage converter 5 has two input contacts 5.1, 5.2 and two output contacts 5.3, 5.4, with the input contact 5.1 being connected via a connecting line 8.1 to the phase conductor 2.1, the input contact 5.2 being connected via the connecting line 8.2 to the neutral conductor 2.2, the output contact 5.3 being connected via the connecting line 8.3 to the positive electrode 3.1, and the output contact 5.4 being connected via a connecting line 8.4 to the negative electrode 3.2.

For radio-frequency coupling, the phase conductor 2.1 is connected via a radio-frequency line 9.1 to the positive electrode 3.1, and the neutral conductor 2.2 is connected via a radio-frequency line 9.2 to the negative electrode 3.2, with the high-pass filter being formed by a respective capacitance, for example a capacitor of appropriate size, 6.1 or 6.2, respectively, per high-frequency line 9.1 or 9.2, respectively.

The low-pass filter 4.1 and the low-pass filter 4.2 are each formed by an inductance 4.3, 4.4, 4.5, 4.6, for example an induction coil of appropriate size, in the two connecting lines 8.1 and 8.2 and, respectively, 8.3 and 8.4.

The additional appliance connection 7, like the mains connection 2, has one phase conductor 7.1, a neutral conductor 7.2 and an earth conductor 7.3, with the earth conductor 7.3 being connected directly to the earth conductor 2.3 of the mains connection 2, and the phase conductor 7.1 and the neutral conductor 7.2 being connected to the corresponding connecting lines 8.1 and 8.2, respectively. The connecting lines 8.1 and 8.2 are respectively tapped off between the inductance 4.3 or 4.4 and the voltage converter 5.

Figure 3:
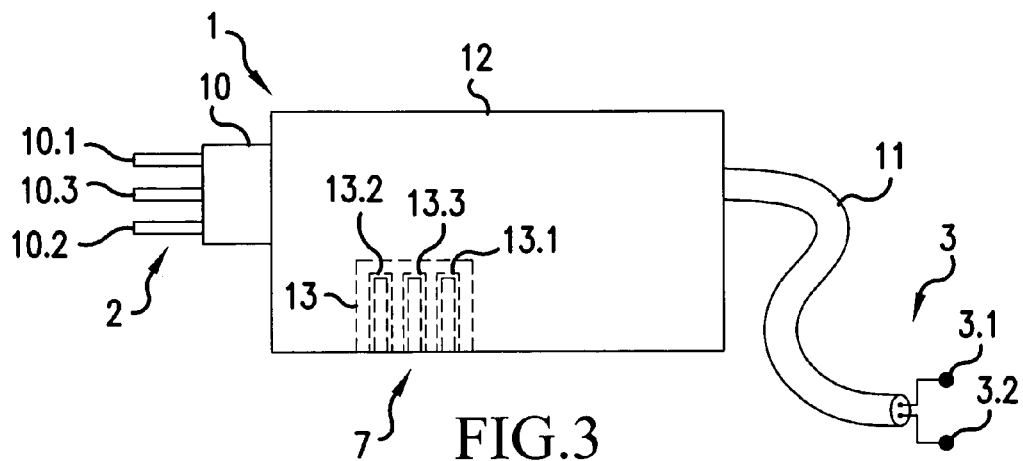
FIG. 3 shows an alternative embodiment of the coupling apparatus.

FIG. 3 shows a specific exemplary embodiment of the coupling apparatus 1 just described. The mains connection 2 is in the form of a mains plug 10 with three contact pins 10.1, 10.2 and 10.3 for the phase, neutral and earth conductors 2.1, 2.2, 2.3. The appliance connection 3 is in the form of a connecting cable 11, for example a cable with conductors routed parallel, and with two contacts being provided for the positive and the negative electrode 3.1, 3.2. The additional appliance connection 7 cannot itself be seen since it has been integrated as a plug socket 13 in the housing 12 of the coupling apparatus 1, and is thus represented by dashed lines. The plug socket 13 comprises three contact sockets 13.1, 13.2, 13.3 for the phase, neutral and earth conductors 7.1, 7.2, 7.3.

Figure 4:
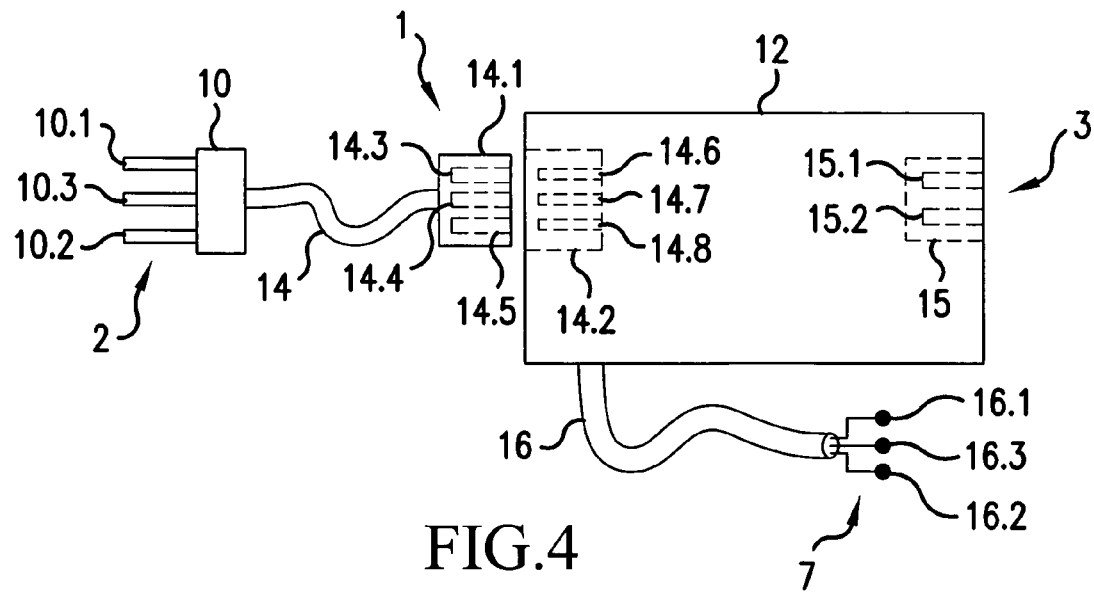
FIG. 4 shows a further alternative embodiment of the coupling apparatus with different connections.

FIG. 4 shows another exemplary embodiment, in which the mains plug 10, together with the contact pins 10.1, 10.2 and 10.3, is located at the end of a mains cable 14, which is routed to the housing 12 of the coupling apparatus 1. The mains cable 14 is either routed directly to the housing or, as shown in FIG. 4, has a mains plug 14.1 with contact sockets 14.3, 14.4, 14.5, which can be inserted into a matching plug socket 14.2 with corresponding contact pins 14.6, 14.7, 14.8 on the housing 12 of the coupling apparatus 1. The appliance connection 3 is integrated in the housing as a plug socket 15 with two contact sockets 15.1, 15.2, with the configuration of the appliance connection 3 as shown in FIG. 3 being preferred. The additional appliance connection 7 is in the form of a connecting cable 16 with three connecting contacts 16.1, 16.2 and 16.3.

Figure 5:
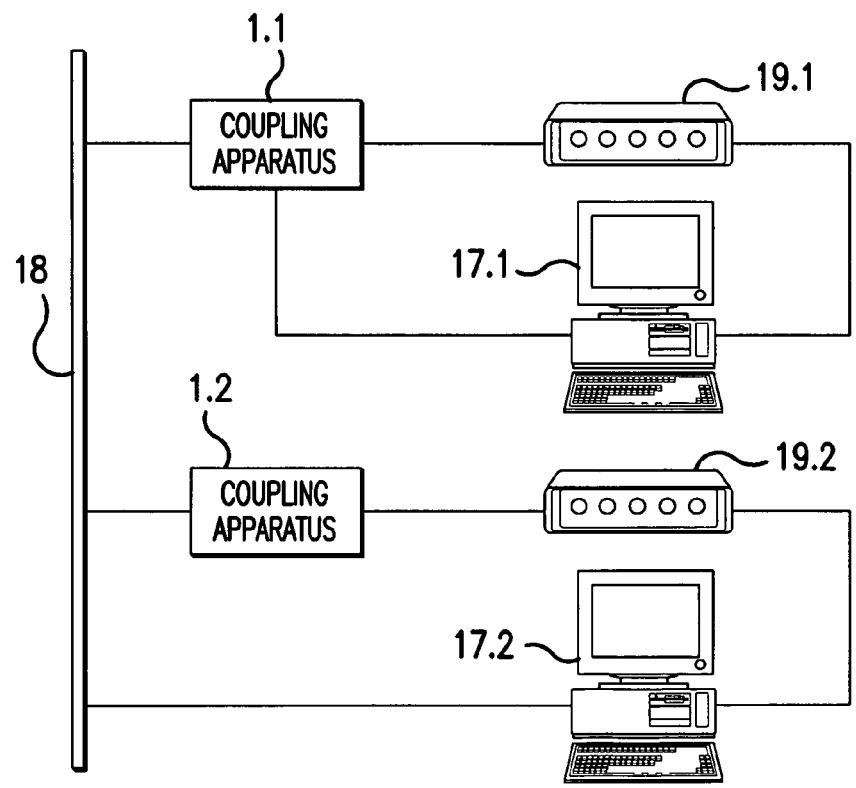
FIG. 5 shows a transmission arrangement according to the invention for transmitting messages via a low-voltage mains power supply system.

The transmission arrangement from FIG. 5 is used for transmitting messages between two computes 17.1, 17.2 via a low-voltage mains power supply system 18. For this purpose, the two computers 17.1, 17.2 are connected to a modem 19.1, 19.2. The modem 19.1 is itself connected via a coupling apparatus 1.1 according to the invention to the low-voltage mains power supply system 18, with the coupling apparatus 1.1 having an additional appliance connection, via which the computer 17.1 is supplied with electrical power. The modem 19.1 is supplied from the coupling apparatus 1.1 with power at a very-low appliance voltage produced by the coupling apparatus 1.1.

The modem 19.2 is likewise connected to a coupling apparatus 1.2 according to the invention but which, in contrast to the coupling apparatus 1.1, does not have an additional appliance connection for supplying further appliances. For power supply purposes, the computer 17.2 is therefore connected directly to the low-voltage mains power supply system 18.

With this arrangement, it is possible to interchange messages between the two computers 17.1, 17.2 via the low-voltage mains power supply system 18. A message produced by the computer 17.1 is passed on to the modem 19.1, which modulates the message onto a radio-frequency carrier signal, which is passed to the coupling apparatus 1.1. The coupling apparatus 1.1 inputs the modulated carrier signal into the low-voltage mains power supply system 18. The coupling apparatus 1.2 once again outputs the RF signal received via the low-voltage mains power supply system 18, and passes this signal on to the modem 19.2, which recovers the message to be transmitted, by demodulation, and transmits it to the computer 17.2. The transmission process also takes place in the opposite direction in the same way.

In summary, it can be stated that the invention allows the construction of an arrangement which can be implemented simply and cost-effectively for transmitting radio-frequency message signals via a low-voltage mains power supply system. Specifically, since those components of the arrangement which carry low voltage are accommodated in a coupling apparatus which is separated from the corresponding modem, both the modem and the coupling apparatus itself can be produced cost-effectively and in a compact form. The coupling apparatus according to the invention in this case carries out a number of functions at the same time in an elegant manner: inputting and outputting of the RF signal, being the linking element between the modem and the mains power supply system, and supplying the modem with power at a very-low voltage, with the RF signal and the electrical power being carried via a single connecting cable to the modem.

What is claimed is:
1. Coupling apparatus, comprising:
a main connection for connection to a low voltage main power supply system;
an appliance connection for connection of a modem;

a voltage converter for converting a low voltage, which is input via the main connection, to a very-low voltage for supplying electrical power to the modem via the appliance connection; and a coupler for radio-frequency coupling between the main connection and the appliance connection, for receiving an RF signal from the modem via the appliance connection and transmitting to the low-voltage main power supply system via the main connection, and for receiving an RF signal from the low-voltage main power supply via the main connection and transmitting to the modem via the appliance connection.

2. Coupling apparatus according to claim 1, wherein the voltage converter converts a low AC voltage which is present at the main connection to a very-low DC voltage which can be emitted at the appliance connection.

3. Coupling apparatus according to claim 1 or 2, wherein a low-pass filter is provided between the voltage converter and the main connection, and/or between the voltage converter and the appliance connection.

4. Coupling apparatus according to claim 1, wherein said coupler comprises a high-pass filter located between the main connection and the appliance connection, in which case an RF signal received via the appliance connection can be coupled to the main connection, and an RF signal received via the mains connection can be coupled to the appliance connection.

5. Coupling apparatus according to claim 1, further comprising at least one additional appliance connection for supplying power to an appliance which can be operated with electrical power.

6. Coupling apparatus according to claim 5, wherein the additional appliance connection is connected to the main connection via a main link in order to supply the appliance connected to the additional appliance connection with the main links running via a low-pass filter which may be connected between the main connection and the voltage converter.

7. Coupling apparatus according to claim 1, wherein
the appliance connection comprises a positive and a negative electrode, and
the main connection comprises a neutral conductor and at least one phase conductor,
one input of the voltage converter is connected via two connecting lines to the neutral conductor and to the at least one phase conductor, or to two phase conductors,
one output of the voltage converter is connected via two connecting lines to the two electrodes of the appliance connection, and
the two electrodes of the appliance connection are connected via two radio-frequency lines to the neutral conductor and to the at least one phase conductor, or to two phase conductors,
with any low-pass filter which may be present being formed by in each case one inductance per connecting line, and any high-pass filter which may be present being formed by in each case one capacitance per radio-frequency line.

8. Coupling apparatus according to claim 1, wherein the main connection and any additional appliance connection which may be present comprise a protective conductor, in particular an earth conductor.

9. Coupling apparatus according to claim 1, which is accommodated in a dimensionally stable housing, wherein the main connection is in the form of a main plug, the appliance connection is in the form of a main plug, the appliance connection is in the form of a supply/signal cable which is routed out of the housing, and any additional appliance connection which may be present is in the form of a plug socket, with the housing being designed such that the main connection of the coupling apparatus can be connected to a low-voltage main power supply system, an appliance which is to be supplied with the very-low voltage can be connected to the appliance connection, and an appliance which is to be supplied with main voltage can be connected to the additional appliance connection which may be present.

10. Transmission arrangement for transmitting and receiving an RF signal via a low-voltage main power supply system, comprising a transmitting/receiving modem and a coupling apparatus, said coupling apparatus comprises a main connection for connection to the low-voltage main power supply system, an appliance connection for connection to the transmitting/receiving modem, a voltage converter for converting a low voltage, which is present at the main connection, to a very-low voltage which can be emitted at the appliance connection, and a coupler for radio-frequency coupling between the main connection and the application connection, wherein said coupling apparatus is connected via its main connection to the low-voltage main power supply system, and the transmitting/receiving modem is connected via the appliance connection of the coupling apparatus, in such a manner that the transmitting/receiving modem is supplied with electrical power via the appliance connection of the coupling apparatus, and an RF signal produced by the transmitting/receiving modem is transmitted to the coupling apparatus from where it is input into the low-voltage main power supply system, and an RF signal transmitted via the low-voltage main power supply system is output by the coupling apparatus from the low-voltage main power supply system, and is transmitted to the transmitting/receiving modem.

11. Transmission arrangement according to claim 10, wherein the coupling apparatus has a low-pass filter between the voltage converter and the main connection, and/or between the voltage converter and the appliance connection.

12. Transmission arrangement according to claim 10 or 11, wherein the coupling apparatus comprises a high-pass filter connected between the main connection and the appliance connection, in which case an RF signal received by the transmitting/receiving modem can be input into the low-voltage main power supply system, and an RF signal transmitted via the low-voltage main power supply system can be output from the low-voltage main power supply system and can be passed on to the transmitting/receiving modem.

13. Transmission arrangement according to claim 10, wherein the coupling apparatus has an additional appliance connection for supplying power to an appliance which can be operated with electrical power.

14. Transmission arrangement according to claim 10, wherein
the transmitting/receiving modem has a two-pole supply/signal connection via which it can be supplied with electrical power and at the same time can receive and transmit the RF signal,
the appliance connection of the coupling apparatus comprises a positive and a negative electrode, and its main connection and any additional appliance connection which may be present each comprise a neutral conductor and at least one phase conductor, one input of the voltage converter is connected via two connecting lines to the neutral conductor and to the at least one phase conductor, or to two phase conductors, one input of the voltage converter is connected via two connecting lines to the two electrodes of the appliance connection, and the two electrodes of the appliance connection are connected via two radio-frequency lines to the neutral conductor and to the at least one phase conductor, or to two phase conductors, with any low-pass filter which may be present being formed by in each case one inductance per connecting line, and any high-pass filter which may be present being formed by in each case one capacitance per radio-frequency line, the main connection of the coupling apparatus is designed for connection to a low-voltage mains power supply system having a neutral conductor and at least one phase conductor, and the two electrodes of the appliance connection of the coupling apparatus are connected to a respective pole of the two-pole signal connection of the transmitting/receiving apparatus.

15. Transmission apparatus according to claim 10, for connection of the coupling apparatus to a low-voltage main power supply system which has a protective conductor, the main connection and any additional appliance connection which may be present comprise a protective conductor, in particular an earth conductor.

* * * * *